United States Patent Office 2,739,940
Patented Mar. 27, 1956

2,739,940

DRILLING FLUID ADDITIVE AND METHODS FOR USING THE SAME

Herbert M. Barrett, Oklahoma City, Okla., assignor to Phillips Petroleum Company, a corporation of Delaware No Drawing. Application December 18, 1952,
Serial No. 326,792

10 Claims. (Cl. 252—8.5)

This invention relates to the art of drilling wells. In another aspect, it relates to drilling fluids utilizing rock wool or a mixture of rock wool and mica as a lost circulation material additive.

In the art of drilling wells, especially drilling by the rotary method, it is necessary to use a drilling fluid, as is well understood in the art. The drilling fluid lubricates the drill stem, carries the cuttings to the surface of the well and forms a filter cake on the walls of the well, preventing loss of any substantial amount of liquid from the drilling fluid to the natural formations penetrated. In the drilling of oil wells, formations are often encountered which take up the drilling fluid so rapidly that circulation is lost. In cases of this kind it has been necessary, further, to add solid constituents to the drilling fluid, such as cotton seed hulls, ground up paper, wood pulp, glass wool, finely divided carbonaceous materials and other solids. However, there are some instances in which the addition of the above materials has not been appreciably effective.

I have discovered that rock wool or a mixture of rock wool and mica is an excellent lost circulation material when added to a drilling fluid and that rock wool possesses unsuspected and outstanding advantages over other materials known to the art to function as preventatives for lost circulation.

An object of my invention is to provide an improved method of drilling wells.

Another object is to provide an improved drilling fluid.

Another object is to provide a drilling fluid additive which can be incorporated into a drilling fluid to insure that such drilling fluid will have the desirable characteristics of low liquid loss and of providing an effective filter cake on the walls of the well.

Another object is to provide a drilling fluid additive which can be acidized and removed from producing formations and is stable in high pH drilling fluids.

Other objects and advantages will be apparent to those skilled in the art upon reading the following detailed description and claims.

The necessity for having a drilling fluid additive which is inexpensive, available in adequate supply and is not subject to Government allocation is obvious. Rock wool is such a material and I have discovered that it possesses definite advantages over other additives known to the art. Organic materials, such as cotton seed hulls and the wood and cane fibers support fermentation in the drilling fluid which is injurious to the properties of the drilling fluid and rock wool will not support such fermentation. Thus, no preservative is required to prevent fermentation of the drilling fluid or to prevent fermentation and resultant loss of the additive itself while in storage, as is true in the case of various organic additives. I have found that rockwool, being composed of a wide distribution of fiber lengths, mixes well with all types of drilling fluids, does not clog the valves of pumps used to circulate the drilling fluids and has excellent matting properties to form a filter cake on the walls of the bore hole. Rock wool has the advantageous property of being non-absorbent and its presence does not affect the gelation of the drilling fluids. In addition, rock wool is less erosive on drilling equipment and this, combined with the property of being soluble in acid is an advantage over glass wool.

In many cases, it can be desirable to admix with the rock wool from 10 to 40 per cent by weight of mica based upon the weight of the mixture of rock wool and mica. The greater tensile strength of the mica adds greatly to the strength of the filter cake on the walls of the bore hole, since the mica is embedded in the rock wool and plugs the porous spaces between the rock wool particles and fibers.

The term "rock wool" as used herein is intended to include all standard manufactured rock wools. The rock wool can be in a loose, granulated or felted form and is conventionally made by blowing a jet of steam against molten rock. The composition of rock wools varies to some extent but a representative composition is 40 per cent $SiO_2$, 12 per cent $Al_2O_3$, 35 per cent CaO, 11 per cent MgO and 1 per cent $Fe_2O_3$. Since an important advantage of rock wool over other solids, such as glass wool, as drilling fluid additives, is its property of being soluble in acid and thereby removable from producing formations, the rock wool utilized should be at least 25 per cent by weight soluble in a 15 per cent solution of hydrochloric acid, preferably being soluble up to 50 per cent by weight in such an acidic solution. However, where acidic removal from producing formations is not a prime objective, rock wools of less acid-soluble characteristics could be utilized with good results.

The maximum amount of rock wool or mixture of rock wool and mica to be added to the drilling fluid can vary within wide limits; however, the maximum amount used, generally, will be that amount which when added to the drilling fluid, still yields a pumpable fluid under the conditions and with the equipment then and there being utilized. However, the amount used will range up to 30 pounds of rock wool or mixture of rock wool and mica per barrel of drilling fluid. In drilling operations, when it is anticipated that lost circulation may result, but before appreciable lost circulation has begun, it may be desirable to use as low as one pound of rock wool or mixture of rock wool and mica per barrel of drilling fluid. If lost circulation has occurred but is not considered serious, approximately 10 pounds of rock wool or mixture of rock wool and mica per barrel of drilling fluid is preferable. After serious lost circulation has occurred, it may be found advisable to mix a small quantity of drilling fluid and rock wool or mixture of rock wool and mica in the proportions of as high as 30 pounds of rock wool or mixture of rock wool and mica, per barrel of drilling fluid, and pump this highly concentrated fluid and additive into the well, followed by drilling fluid which may contain either only a medium concentration of rock wool or mixture of rock wool and mica or no such additive at all.

The disclosed advantages for an additive to drilling fluids composed of rock wool or mixture of rock wool and mica will be found to be equally effective with all of the conventional drilling fluids, such as water-base muds, oil-base muds and emulsions. A water-base mud can comprise, for example, bentonite colloidally dispersed in either fresh or salt water and containing, if desired, various other clays, such as kaolin, starch, and also, commonly used modifying agents such as quebracho and caustic.

A suitable mud is a suspension of 1 to 6 per cent parts by weight of bentonite in water, with or without the addition of, for example, 2 to 10 pounds per barrel of starch, approximately 10 pounds per barrel of quebracho and caustic to establish a pH of from 7 to 12.5.

Having described my invention, I claim:

1. A well drilling fluid comprising sufficient fluid that the well drilling fluid is pumpable and sufficient rock wool that the loss of the drilling fluid, when circulated in well bore, is decreased.

2. A well drilling fluid for forming a filter cake on the wall of a well bore which comprises a drilling fluid and up to 30 pounds of rock wool per barrel of drilling fluid.

3. A well drilling fluid comprising sufficient fluid that the well drilling fluid is pumpable, and sufficient rock wool that the loss of the drilling fluid, when circulated in a well bore, is decreased, said rock wool being soluble in a 15 per cent solution of hydrochloric acid in the range from 25 to 50 per cent by weight of the rock wool.

4. A well drilling fluid for forming a filter cake on the wall of a well bore which comprises a drilling fluid and up to 30 pounds of rock wool per barrel of drilling fluid, said rock wool being soluble in a 15 per cent solution of hydrochloric acid in the range from 25 to 50 per cent by weight of the rock wool.

5. A well drilling fluid comprising sufficient fluid that the well drilling fluid is pumpable, and a mixture of rock wool and mica having from 10 to 40 per cent by weight of mica based upon the weight of the mixture of rock wool and mica said well drilling fluid containing a quantity of said mixture, sufficient that the loss of the drilling fluid, when circulated in a well bore, is decreased.

6. A well drilling fluid for forming a filter cake on the wall of a well bore which comprises a drilling fluid and up to 30 pounds of a mixture of rock wool and mica, said mixture having from 10 to 40 per cent by weight of mica based upon the weight of the mixture of rock wool and mica.

7. A well drilling fluid for forming a filter cake on the wall of a well bore which comprises a drilling fluid and up to 30 pounds of a mixture of rock wool and mica, said mixture having from 10 to 40 per cent by weight of mica based upon the weight of the mixture of rock wool and mica, said rock wool being soluble in a 15 per cent solution of hydrochloric acid in the range from 25 to 50 per cent by weight of the rock wool.

8. In a process for drilling a well with well drilling tools wherein there is circulated in the well a drilling fluid, the method of forming a filter cake on the wall of said well to decrease the loss of drilling fluid into surrounding earthen formations which comprises, adding to the drilling fluid a sufficient quantity of rock wool to decrease said loss of drilling fluid, but insufficient to prevent pumpability of the drilling fluid, and contacting said wall of said well with the resulting drilling fluid to form said filter cake thereon.

9. In process for drilling a well with well drilling tools wherein there is circulated in the well a drilling fluid, the method of forming a filter cake on the wall of said well to decrease the loss of drilling fluid into surrounding earthen formations which comprises admixing with said drilling fluid up to 30 pounds of rock wool per barrel of drilling fluid, said rock wool being soluble in a 15 per cent solution of hydrochloric acid in the range from 25 to 50 per cent by weight and contacting said wall of said well with the resulting drilling fluid to form said filter cake thereon.

10. In a process for drilling a well with well drilling tools wherein there is circulated in the well a drilling fluid, the method of forming a filter cake on the wall of said well to decrease the loss of drilling fluid into surrounding earthen formations which comprises admixing with said drilling fluid up to 30 pounds per barrel of drilling fluid of a mixture of rock wool and mica, said mixture having from 10 to 40 per cent by weight of mica based upon the mixture of rock wool and mica, said rock wool being soluble in a 15 per cent solution of hydrochloric acid in the range from 25 to 50 per cent by weight of the rock wool, and contacting said wall of said well with the resulting drilling fluid to form said filter cake thereon.

References Cited in the file of this patent

UNITED STATES PATENTS

| | | |
|---|---|---|
| 1,807,082 | Boynton | May 26, 1931 |
| 2,064,936 | McQuiston | Dec. 22, 1936 |
| 2,214,336 | Freeland et al. | Sept. 10, 1940 |